US012602427B2

(12) United States Patent
Tiistola

(10) Patent No.: US 12,602,427 B2
(45) Date of Patent: Apr. 14, 2026

(54) TRANSFORMING DATA FROM STREAMING MEDIA

(71) Applicant: Google LLC, Mountain View, CA (US)

(72) Inventor: Jaakko Henrikki Tiistola, San Bruno, CA (US)

(73) Assignee: Google LLC, Mountain View, CA (US)

( * ) Notice: Subject to any disclaimer, the term of this patent is extended or adjusted under 35 U.S.C. 154(b) by 21 days.

(21) Appl. No.: 17/918,974

(22) PCT Filed: Sep. 24, 2021

(86) PCT No.: PCT/US2021/051864
§ 371 (c)(1),
(2) Date: Oct. 14, 2022

(87) PCT Pub. No.: WO2022/093453
PCT Pub. Date: May 5, 2022

(65) Prior Publication Data
US 2023/0244716 A1 Aug. 3, 2023

Related U.S. Application Data

(60) Provisional application No. 63/107,943, filed on Oct. 30, 2020.

(51) Int. Cl.
*G06F 16/61* (2019.01)
*G06F 16/683* (2019.01)
*G06F 40/279* (2020.01)

(52) U.S. Cl.
CPC ............ *G06F 16/685* (2019.01); *G06F 16/61* (2019.01); *G06F 40/279* (2020.01)

(58) Field of Classification Search
None
See application file for complete search history.

(56) References Cited

U.S. PATENT DOCUMENTS 8,612,211 B1 * 12/2013 Shires ..................... G10L 15/26
704/235
2006/0212897 A1 9/2006 Li et al.
(Continued)

FOREIGN PATENT DOCUMENTS

CN 102771115 11/2012
CN 107039040 8/2017
CN 106792003 4/2020

OTHER PUBLICATIONS

Office Action in Japanese Appln. No. 2022-568898, mailed on Feb. 13, 2024, 6 pages (with English translation).
(Continued)

*Primary Examiner* — Yu Zhao
(74) *Attorney, Agent, or Firm* — Fish & Richardson P.C.

(57) ABSTRACT

Methods, systems, and apparatus, including computer programs encoded on computer storage media, for creating augmented content streams by transforming non-textual content into a form that enables a text-based matching system to select non-textual content are described. In some aspects, a method includes obtaining first audio, storing a text transcription of the first audio in a searchable database. Media content that includes second audio is obtained. The second audio is transformed into textual content. A determination is made, based on a search of the searchable database, that the textual content of the second audio matches the text transcription of the first audio. The first audio is inserted into the media content to create an augmented content stream in response to the determination that the textual content of the second audio matches the text transcription of the first audio.

20 Claims, 4 Drawing Sheets

(56) References Cited

U.S. PATENT DOCUMENTS

| | | | |
|---|---|---|---|
| 2008/0065602 A1* | 3/2008 | Cragun | G06F 16/3334 |
| 2008/0201361 A1* | 8/2008 | Castro | G06Q 30/02 |
| 2011/0238495 A1 | 9/2011 | Kang | |
| 2012/0197648 A1* | 8/2012 | Moloney | G10L 19/018 |
| | | | 381/56 |
| 2014/0236572 A1 | 8/2014 | Meshulam et al. | |
| 2016/0179831 A1 | 6/2016 | Gruber et al. | |
| 2017/0352361 A1* | 12/2017 | Thörn | G11B 27/031 |
| 2018/0173388 A1* | 6/2018 | Holmes | G06F 16/686 |
| 2020/0105274 A1 | 4/2020 | Joller et al. | |

OTHER PUBLICATIONS

Office Action in European Appln. No. 21799399.7, mailed on Aug. 11, 2023, 4 pages.
Office Action in Indian Appln. No. 202227058864, mailed on Sep. 11, 2023, 7 pages (with English translation).
International Search Report and Written Opinion in International Appln. No. PCT/US2021/051864, mailed on Jan. 5, 2022, 13 pages.
International Preliminary Report on Patentability in International Appln. No. PCT/US2021/051864, mailed on May 11, 2023, 7 pages.
Notice of Allowance in Japanese Appln. No. 2022-568898, mailed on Jul. 29, 2024, 5 pages (with English translation).
Office Action in European Appln. No. 21799399.7, mailed on Jul. 31, 2024, 7 pages.
Office Action in Canadian Appln. No. 3,178,823, mailed on Apr. 22, 2024, 4 pages.
Office Action in Canadian Appln. No. 3,178,823, mailed on May 22, 2025, 8 pages.
Office Action in Indian Appln. No. 202227058864, mailed on Nov. 18, 2024, 3 pages (with English translation).
Office Action in Chinese Appln. No. 202180034022.8, mailed on Dec. 11, 2025, 15 pages (with English translation).
Office Action in Korean Appln. No. 10-2022-7038447, mailed on Jan. 17, 2026, 16 pages (with English translation).

* cited by examiner

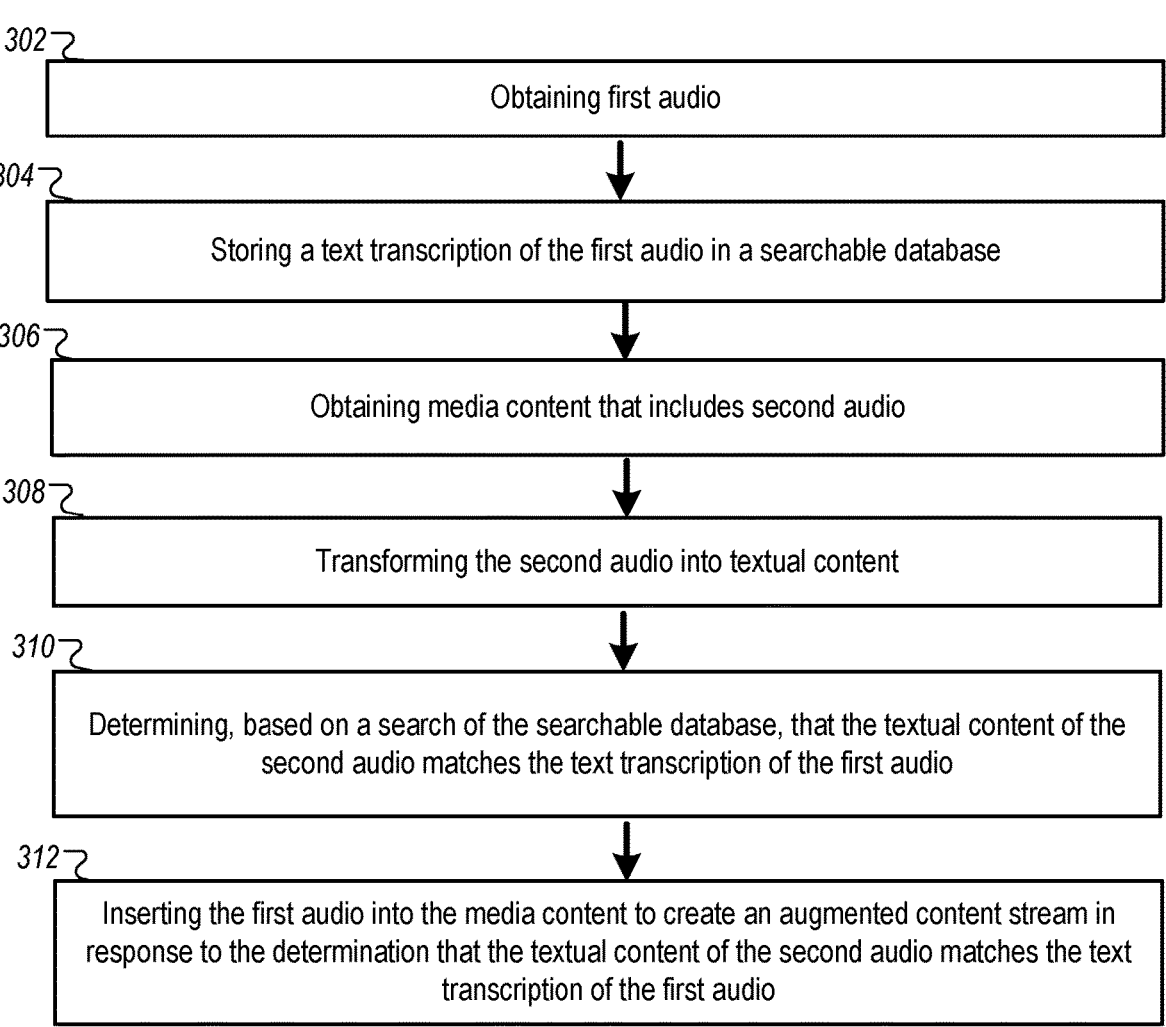

302

Obtaining first audio

304

Storing a text transcription of the first audio in a searchable database

306

Obtaining media content that includes second audio

308

Transforming the second audio into textual content

310

Determining, based on a search of the searchable database, that the textual content of the second audio matches the text transcription of the first audio

312

Inserting the first audio into the media content to create an augmented content stream in response to the determination that the textual content of the second audio matches the text transcription of the first audio

FIG. 3

TRANSFORMING DATA FROM STREAMING MEDIA

CROSS-REFERENCE TO RELATED APPLICATION

This application is a National Stage Application under 35 U.S.C. § 371 and claims the benefit of International Application No. PCT/US2021/051864, filed Sep. 24, 2021, which claims priority to U.S. Provisional Application No. 63/107, 943, filed Oct. 30, 2020. The disclosures of the foregoing applications are hereby incorporated by reference in [its] their entirety.

BACKGROUND

This specification relates to data processing and transforming data from streaming media to detect features of the streaming media.

SUMMARY

In general, one innovative aspect of the subject matter described in this specification can be embodied in a method that includes obtaining first audio, storing a text transcription of the first audio in a searchable database, obtaining media content that includes second audio, transforming the second audio into textual content, determining, based on a search of the searchable database, that the textual content of the second audio matches the text transcription of the first audio, and inserting the first audio into the media content to create an augmented content stream in response to the determination that the textual content of the second audio matches the text transcription of the first audio.

In some implementations, the method includes determining a first context of the first audio based on the textual transcription of the first audio and determining a second context of the second audio based on the textual content of the second audio. Determining that the textual content of the second audio matches the text transcription of the first audio can include determining that the first context matches the second context.

In some implementations, transforming the second content into textual content includes detecting spoken words in the second audio, analyzing one or more audio characteristics of the second audio, adjusting an importance of one or more words from among the spoken words based on the analysis of the one or more audio characteristics, generating the textual content representing the spoken words, and assigning the adjusted importance of the one or more words to the textual content representing the one or more words. In some implementations, analyzing the one or more audio characteristics of the second audio includes detecting an audible indication of emphasis for the one or more words. Adjusting the importance of the one or more words can include increasing the importance of the one or more words based on the audible indication of emphasis. Determining the context of the second audio can include determining a topic of the first audio based on the adjusted importance of the one or more words that is assigned to the textual content representing the one or more words.

In some implementations, analyzing one or more audio characteristics can include differentiating between a first portion of the spoken words that are spoken by a host voice in the second audio and a second portion of the spoken words that are spoken by a guest voice in the second audio. Adjusting the importance of the one or more words can include increasing the importance of the first portion of spoken words relative to the importance of the second portion of the spoken words.

In some implementations, the method includes identifying exclusion zones for the second audio, omitting words spoken during the exclusion zones from the textual content of the second audio. The method can further include detecting a product name in the second audio and omitting, from the textual content of the second audio, words spoken within a specified amount of time of the location of the product name in the second audio.

Other embodiments of this aspect include corresponding systems, apparatus, and computer programs, configured to perform the actions of the methods, encoded on computer storage devices.

Media content that users request and consume is generally provided in text format and existing systems are tailored to analyze and select content using text-based characteristic data. Current methods for matching and selecting additional media content for media that is not text-based depend on context data (e.g., in the form of text metadata) that is often manually provided by the media content generator. However, text-based systems do not utilize the actual audio/video media content itself to match and/or select media content. This can result in resources being wasted, for example, when the context data that is assigned to content either inaccurately describes the content or fails to provide an adequate description of the content because this can result in distribution of content that is not useful in the context of the media content being streamed, which can result in additional media content needing to be streamed and additional resources being consumed such as network bandwidth, processing power and memory usage, and battery usage (e.g., of mobile devices).

The following description discusses various techniques and systems for improving mechanisms that control whether content is transmitted over a network by transforming non-textual streaming media content into a form that enables selecting content for presentation with the streaming media content. Particular embodiments of the subject matter described in this specification can be implemented to realize one or more of the following advantages. For example, the system allows non-text content to be used in text matching mechanisms to enable the selection of audio content to be presented to a user with the streaming media content item based on the determination that the non-text content corresponds to the audio content.

The techniques described in this document can enhance the transformation of streaming media content (e.g., audio content, such as a podcast) based on various audio characteristics beyond words spoken within the streaming media content. For example, the techniques discussed herein can differentiate between a host of a streaming media program (e.g., a podcast) and a guest of the podcast. Using this distinction of who is speaking, the techniques described in this document can filter out words spoken by the guest so that only the topics discussed by the host are used for purposes of selecting additional content to present with the streaming media program. In some situations, rather than filtering out the words spoken by the guest, the words spoken by the host could be weighted higher than those spoken by the guest, thereby putting more emphasis on the words spoken by the host. In either of these situations, the system is able to emphasize the topics discussed by the host relative to those discussed by the guest, which enhances the ability of the system to identify additional content that is related to the topics being discussed by the host, and prevents semantic drift that may occur if there was no distinction made between the speakers.

The techniques discussed herein also provide improvements over traditional systems by emphasizing transformations of the words spoken in streaming media content (e.g., podcasts) based on audio characteristics other than identification of the speaker. For example, the volume of some words relative to other words can be used to embed (or assign) an emphasis (or other indicators of importance) to words detected in the streaming media content, thereby enhancing the information used to select additional content (e.g., digital components) for presentation with the streaming media content. In some situations, the emphasis assigned to a word can be proportional (e.g., directly or inversely proportional) to the volume of that word, a change in pitch relative to other spoken words, or an amount of detected silence surrounding that word. This provides richer information about the audio of the streaming media content that can be input to text matching mechanisms to provide for a more accurate match between the subject matter of the streaming media content and the additional content selected for presentation.

The existing techniques that require manual selection and integration of additional non-textual content into a particular media content item by its creator is time-consuming and limited to the additional content to which the creator has access or knowledge of. By transforming non-textual content into a format that can be processed and matched by text-based systems, the described techniques allow access to a more diverse and comprehensive selection of additional content, as well as improved and more tailored content selection. Because existing infrastructure and systems can be used, the described techniques reduce resources required to train and improve the content matching and selection process, and allows the non-textual content system to take advantage of accrued knowledge available to existing systems used for text-based content matching and selection. Furthermore, the described techniques allow for more narrowly tailored content by analyzing the entirety of the content than would otherwise be possible using only manually entered, user-defined context data provided by a content creator.

In addition, the use of context to identify and select additional audio content can prevent distribution of inappropriate content, thereby reducing wasted resources. The described techniques reduce the amount of resources expended distributing content that is inappropriate and should not be distributed and more efficiently provide content across a network—the described techniques prevent the distribution of content to an entity that is not actually consuming (listening to and/or viewing) the content. In other words, the computing resources, such as network bandwidth, processor cycles, and/or allocated memory, are not wasted by using these resources to distribute content that should not be distributed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process of content matching and selection using content transformation.

Like reference numbers and designations in the various drawings indicate like elements.

DETAILED DESCRIPTION

Figure 1:
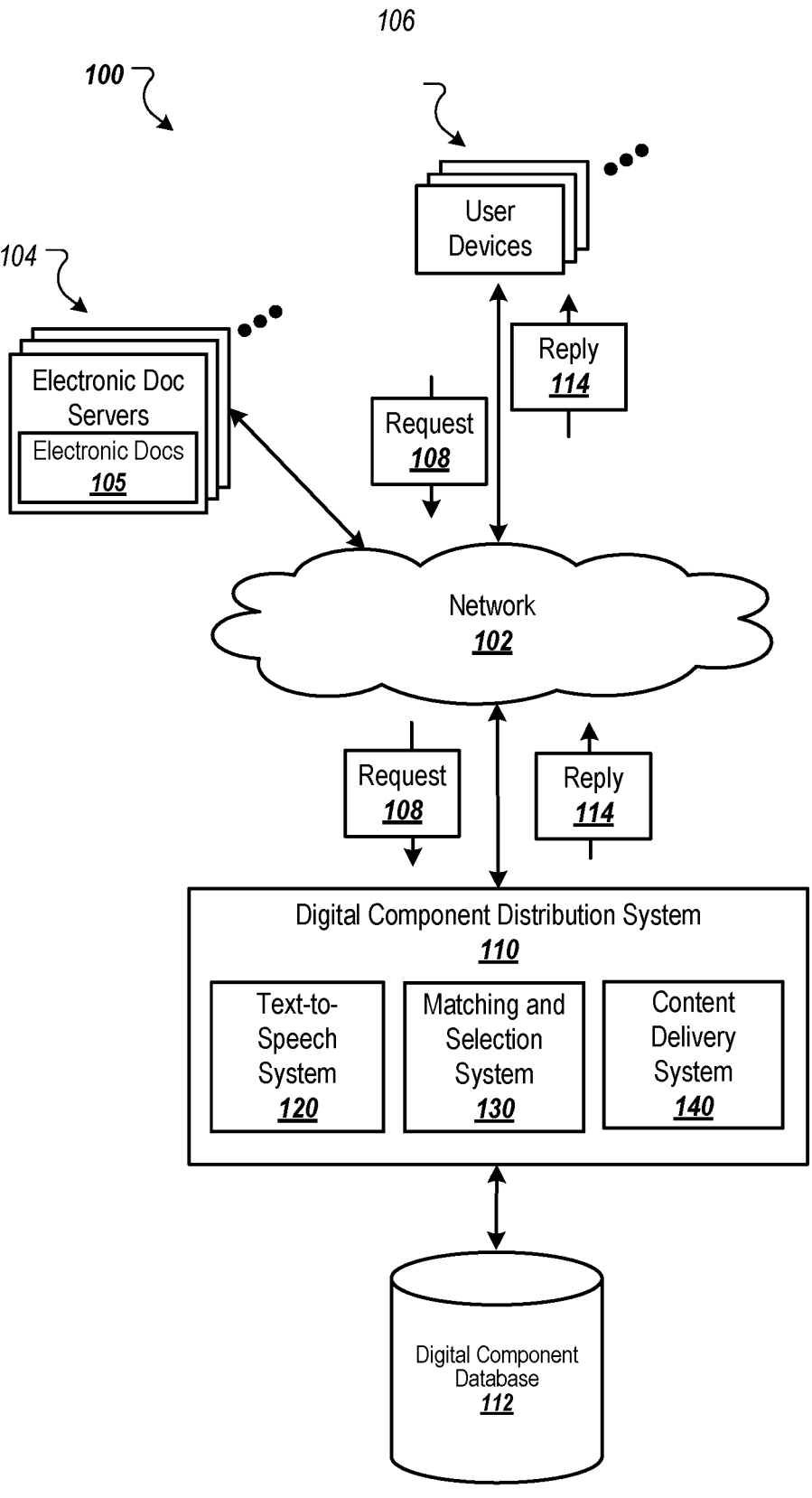
FIG. 1 is a block diagram of an example environment in which a digital component distribution system creates augmented content streams.

This document describes techniques and systems that transform non-textual content into a form that enables a text-based matching system to select non-textual content for presentation. For example, as discussed in more detail below, podcasts (e.g., audio programs with a host and often guests) can be analyzed using the techniques discussed herein, and transformations of the audio aspects of the podcast can be created to enable selection of digital components or other content for presentation with the podcast.

In some implementations, the digital component is in audio form, and the audio of the digital component is obtained. A text transcription of the audio of the digital component can be stored in a text searchable database. Media content that includes audio, such as a podcast, is obtained, and transformed into textual content. There are various ways in which the transformation of the textual content can be encoded (or emphasized) to reflect various audio characteristics of the media content beyond just the words spoken, as described in more detail below. The transformation of the media content is used to search the searchable database to find a match between the media content and one or more digital components that are available for delivery with the media content. The digital component is inserted into the media content to create an augmented content stream, and delivered to a user that has requested the media content. The techniques described herein can be performed at the time a user requests the media content so that additional information (e.g., user specific information, current event information, or other information) can be used to augment the search of the searchable database at the time the media content is being presented, thereby providing a dynamic media item that can be modified for each individual user and/or based on information that changes over time.

Throughout this document, a user (such as an end user, content generator, or content provider, among other types of users) may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which a digital component distribution system 110 creates augmented content streams. The example environment 100 includes a network 102, such as a local area network (LAN), a wide area network (WAN), the Internet, or a combination thereof. The network 102 connects electronic document servers 104 ("Electronic Doc Servers"), user devices 106, and a digital component distribution system 110 (also referred to as DCDS 110). The example environment 100 may include many different electronic document servers 104 and user devices 106.

A user device 106 is an electronic device that is capable of requesting and receiving resources (e.g., electronic documents) over the network 102. Example user devices 106 include personal computers, wearable devices, smart speakers, tablet devices, mobile communication devices (e.g., smart phones), smart appliances, and other devices that can send and receive data over the network 102. In some implementations, the user device can include a speaker that outputs audible information to a user, and a microphone that accepts audible input (e.g., spoken word input) from the user. The user device can also include a digital assistant that provides an interactive voice interface for submitting input and/or receiving output provided responsive to the input. The user device 106 can also include a display to present visual information (e.g., text, images, and/or video). A user device 106 typically includes a user application, such as a web browser, to facilitate the sending and receiving of data over the network 102, but native applications executed by the user device 106 can also facilitate the sending and receiving of data over the network 102.

User device 106 includes software such as a browser or an operating system. In some implementations, the software allows a user to access information through a network, such as network 102, retrieving information from a server and displaying the information on a display of user device 106. In some implementations, the software manages user device 106's hardware and software resources and provides common services for other programs on user device 106. The software can act as an intermediary between programs and the user device's hardware.

An electronic document is data that presents a set of content, e.g., at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source. Media content as referred to herein is a type of digital content.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data that specifies the electronic document and characteristics of locations at which digital content can be presented. For example, data that specifies a reference (e.g., a universal resource locator (URL)) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data that specifies keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information that indicates a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include geographical location, occupation, hobbies, social media data, and whether the user owns a particular item, among other characteristics.

Data that specifies characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

Text-to-speech system 120 is a content transformation system that can transform text content to audio content and audio content to text content. In the context of this description, audio content is not restricted to audio-only content. For example, in some embodiments, audio content can include video content, which can be referred to as multimedia content, and would still be considered audio content for the purposes of this document. Text-to-speech system 120 can perform content transformations using techniques for text-to-speech and speech-to-text transformations. For example, text-to-speech system 120 can transcribe an audio-only file into plaintext. Text-to-speech system 120 can also transform a text-only file into an audio file, which may include a corresponding image file. The output of text-to-speech system 120 can be an audio-only file, a video file having audio and visual data, an image-only file, or a text-only file, among other formats. Text-to-speech system 120 detects words within an audio file and outputs the words, transcribing the content of the audio file.

Matching and selection system 130 performs the content matching and selection process for DCDS 110. For example, matching and selection system 130 can perform analysis of the output of text-to-speech system 120 or any received content to determine particular characteristics of the content itself, such as a topic or category of content, entities mentioned or suggested by the content, and/or the frequency with which a topic or entity is mentioned, among other characteristics. Matching and selection system 130 can also perform analysis to determine characteristics of the audio data, such as volume, emphasis, tone, among other characteristics. For example, matching and selection system 130 can determine a topic or intent for media content.

Matching and selection system 130 can use the transformed media content as input to be used in a content or digital component selection process. For example, matching and selection system 130 can perform a content selection auction according to existing techniques and using the transformed media content as input.

Matching and selection system 130 can perform content matching by matching the characteristics of the content and of the file itself, for example, using artificial intelligence and machine learning techniques to perform the matching.

Matching and selection system 130 can use statistical and/or machine learning models that accept user-provided information and media content as inputs. The machine learning models may use any of a variety of models such as decision trees, generative adversarial network-based models, deep learning models, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, association rules, inductive logic, clustering, maximum entropy classification, learning classification, etc. In some examples, the machine learning models may use supervised learning. In some examples, the machine learning models use unsupervised learning.

Content delivery system 140 performs content packaging and delivery. For example, content delivery system 140 can format content, combine media content, and deliver content to a user device. Content delivery system 140 can, for example, detect digital content slots in which digital content is expected to be delivered within media content being delivered to a user device, such as user device 106. In some implementations, a digital content slot is indicated by a marker or other flag that indicates to content delivery system 140 that additional audio content should be provided. These markers can be defined by the media content provider and/or creator. In some implementations, content delivery system 140 can determine locations at which these markers should be placed within the media content. For example, content delivery system 140 can detect natural pauses in conversation within an audio content file and place markers for additional audio content (e.g., a digital component) to be provided.

In some implementations, content delivery system 140 can provide the additional audio content within the stream of media content within the defined slots, thereby creating an augmented content stream. For example, in some implementations, content delivery system 140 can insert a pause that serves as a defined slot within the audio file at the marker in which additional audio content can be integrated.

In some implementations, content delivery system 140 can pause the delivery of the stream of media content when a marker is detected, separately deliver additional audio content, and then resume delivery of the media content.

Figure 2:
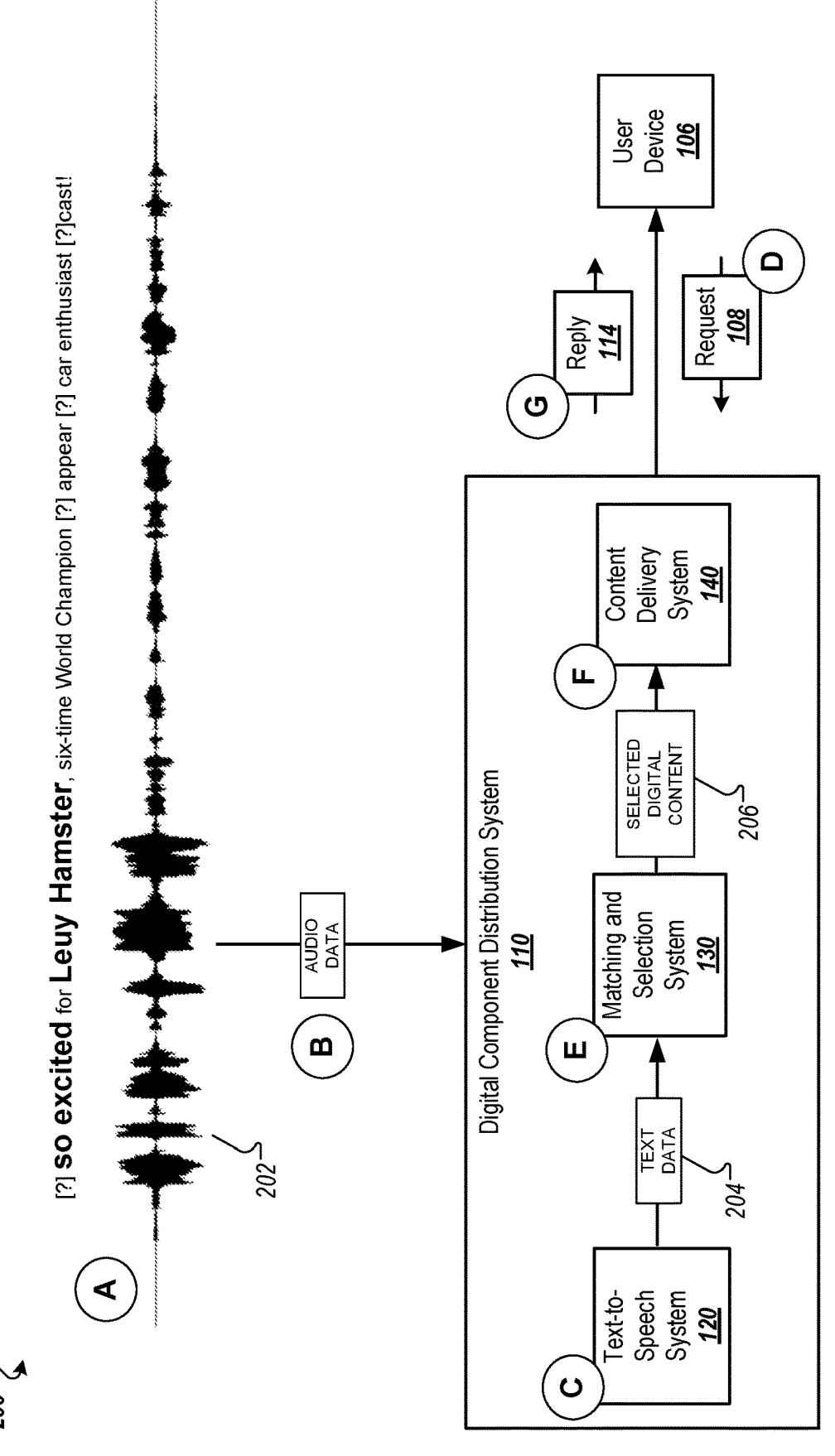
FIG. 2 depicts a data flow of a content transformation method for improved content matching and selection.

FIG. 2 depicts a data flow 200 of a content transformation method for improved content matching and selection. Operations of data flow 200 are performed by various components of the system 100. For example, operations of data flow 200 can be performed by DCDS 110 in communication with user devices 106.

The flow begins with step A, in which non-textual media content is generated and uploaded to a content provider location. For example, a content creator, a podcast host Poddington Casterly, can generate and upload audio-only media content 202 and upload the content 202 to his own website, Cars R Cool N Fast, where he periodically uploads episodes of his car enthusiast podcast. In some implementations, the entirety of the media content is uploaded at once. In some implementations, the media content is uploaded in real time (e.g., at the time the content is to be distributed and/or presented).

In this particular example, the non-textual media content 202 is a podcast episode called "Guest Leuy Hamster talks about his cute bulldogs" that only includes audio data. In other examples, the non-textual media content can include a video file with audio and image data or a video file with only image data, among other types of non-textual media content. For example, the non-textual media can be a TV show or a video game.

The flow continues with step B, in which the audio content is provided to a digital component distribution system. In this example, audio content 202 can be provided by Poddington Casterly to DCDS 110. In some implementations, audio content 202 can be uploaded to DCDS 110 or retrieved by DCDS 110, among other ways of being obtained by DCDS 110.

The described system is particularly efficient, because the audio content can be provided to DCDS 110, which has access to a uniquely large amount of information and models with refined technology for performing portions of the described technique.

The flow continues with step C, in which a text-to-speech system processes audio content received by DCDS 110 and outputs text data. For example, text-to-speech system 120 can process audio data received by DCDS 110 to generate output text data 204. The original form of the media content and the text of the media content can be stored or cached for future requests of the media content. For example, the original form and the text of the media content can be stored in a database such as digital component database 112 or a different remote database. The database in which the original form and/or the text of the media content is stored can be indexed and/or easily searchable. The media content includes both non-textual media content from a content creator and media content to be provided as additional audio content integrated with non-textual media content.

In some implementations, the media content is uploaded in real-time, and steps A, B, and C are performed in real-time. For example, the upload can occur as the media content is being recorded. In some implementations, the non-textual media content is completely uploaded, and steps A, B, and C can be performed as soon as the content is received. In some implementations, the media content is completely uploaded, and steps A, B, and C can be performed when the media content is requested to be provided to a user device.

Text-to-speech system 120 performs a content transformation by analyzing characteristics of the content itself and of the stream. Whereas other text-to-speech or speech-to-text systems may be required to transcribe every word, text-to-speech system 120 does not need to transcribe every word in order to determine the intent, category, topic, volume, etc., of media content. Therefore, the system described herein is particularly efficient because it only needs to transcribe a portion of the media content. In addition, the system is able to exclude low-confidence transcriptions and rely only on high-confidence transcriptions for performing content matching and selection. In some implementations, text-to-speech system 120 can automatically exclude any transcriptions that are below a threshold level of confidence. In some implementations, text-to-speech system 120 can provide the entire transcription to matching and selection system 130, even if there is not enough to perform content matching and selection. In some implementations, text-to-speech system 120 can instead provide a message to matching and selection system 130 that not enough of the content could be transformed.

In some implementations, the additional audio content is received as text-based content and can be transformed by text-to-speech system 120 into the same type of media content as the media content being presented to user device 106. For example, the additional audio content can be received as several lines of text and can be transformed into audio-only content to match the format of Poddington Casterly's podcast episode "Guest Leuy Hamster talks about his cute bulldogs."

In some implementations, the additional audio content is received as non-textual content and can be transcribed by text-to-speech system 120 into text. The text of the additional audio content can then be stored within a database, such as digital component database 112. The original form of the additional audio content can be stored as well, such that matching can be performed with the text of the additional audio content, and the additional audio content itself can be provided upon request.

In some implementations, audio content can include multiple speakers. For example, podcast 202 can include two speakers: Poddington Casterly and his guest, Leuy Hamster. Text-to-speech system 120 can differentiate between the voices of Poddington Casterly, the host, and Leuy Hamster, the guest. In some implementations, text-to-speech system 120 can indicate within its text output 204 what text was spoken by which speaker. For example, text-to-speech system 120 can flag each portion of text with its speaker. Text-to-speech system 120 can differentiate between the voices of different speakers based on one or more characteristics of the audio. For example, text-to-speech system 120 can compare differences between two voices, match the characteristics of a particular voice to a particular voice profile that indicates a unique combination of frequency and/or tone characteristics, and/or learn and develop a voice profile for each speaker, among other techniques.

The flow continues with step D, in which DCDS 110 receives, from a user device, a request for content that includes various information, such as information about the user of the user device. For example, DCDS 110 can receive a request 108 from a user of user device 106 that includes profile information of the user.

The flow continues with step E, in which matching and selection system 130 uses the text data 204 from text-to-speech system 120 to perform matching and selection of digital content to be presented with media content. The text data 204 can include text data of the media content being streamed to user device 106 as well as the text data of digital content available for presentation with the media content. In some implementations, matching and selection system 130 can access text data 204 from a database that is searchable.

Matching and selection system 130 performs the matching and selection process according to techniques used with text content. For example, matching and selection system 130 can match characteristics, such as topic or entity of the media content, to other digital content items, e.g., to transcribed text of the content items. Particular characteristics of the media content can be given more weight than other characteristics when determining other characteristics. For example, matching and selection system 130 can give the title of a podcast episode more weight than words that are simply within the content of the episode. In some implementations, matching and selection system 130 determines and assigns a topic, or some other information, to the additional audio content.

Matching and selection system 130 can assign more weight to words spoken at the beginning of different speaker's time speaking, to words spoken with particular tones of voice, to phrases containing a particular entity or topic. In some implementations, matching and selection system 130 assigns particular weight to words spoken by the host of the content if there are multiple speakers. For example, on a podcast or talk show, the host may ask guests to join them, but the guests may have views that the host does not agree with. Matching and selection system 130 can default to matching content only to what is spoken by the host. In some implementations, matching and selection system 130 can provide content creators and/or publishers with the option of choosing whether they would like to allow for content matching and what portions of their content can be used for content matching. Matching and selection system 130 can also provide users (content creators, publishers, end users) with the option of disallowing certain digital content to be provided with the media content being streamed.

Additionally, matching and selection system 130 can assign more weight based on other characteristics, including the quality of the additional audio content to be selected, the quality of the media content being streamed to the user device, whether there is music in the background, and/or the type of music being played, among other characteristics.

Text-to-speech system 120 can capture characteristics of the non-textual content and provide these characteristics to matching and selection system 130. For example, text-to-speech system 120 can determine that the creator of the content has placed emphasis or other special significance on particular words or phrases and draw parallels between non-textual emphasis and a textual counterpart. In one example, text-to-speech system 120 can determine that if the person speaking in the audio content says a particular word or phrase loudly, the word or phrase may be considered to be emphasized in the same way as bold text, underlined text, larger font, among other visual forms of emphasis. Other forms of audible emphasis include the pitch and speed of the word(s) or phrase(s) being spoken. For example, if a speaker uses a very low pitch and speaks a phrase quickly, text-to-speech system 120 may determine that the phrase was not meant to be important, or that the speaker did not agree with the phrase being said.

For example, podcast 202 is shown to include audio data that indicates an audible indication, in this case corresponding to a larger magnitude, for the words "so excited" and "Leuy Hamster" than other words, and text-to-speech system 120 can consider the words to emphasized as if they had been bolded, and matching and selection system 130 can assign weight to the words as if they were bolded, or otherwise add metadata indicating the increased emphasis, such as bolding or underlining. Matching and selection system 130 can use audible indications of the words spoken in the audio content in addition to indications provided within sources such as metadata.

Matching and selection system 130 can continually improve its matching and selection algorithms and process. For example, matching and selection system 130 can determine that certain members of Poddington Casterly's audience will stream each of his podcast episodes, but do not necessarily listen to the entirety of the podcast. Matching and selection system 130 can then assign a probability of match to content that increases over time for particular content where a user is likely to eventually hear it. As described above with respect to FIG. 1, matching and selection system 130 can use machine learning models and probabilistic models.

In some implementations, when matching and selection system 130 either determines or receives a message that there is not enough of the transformed content to perform matching and selection, matching and selection system 130 can select a default or generic type of digital content to provide to the user device with the media content.

In some implementations, matching and selection system 130 can access profile information for the user of user device 106 and/or for the content creator or publisher to augment and/or improve the matching and selection process. For example, matching and selection system 130 can access a user's profile information to determine that the user is not interested in seeing ads about cat food, but is interested in ads about dog food, even though the user likes animals in general.

In some implementations, matching and selection system 130 can give more weight to information matching the user's profile. For example, matching and selection system 130 can personalize additional audio content based on the user's profile, the content within the media content being streamed, and to the media content's creator and/or publisher.

When selecting the digital content, the matching and selection system 130 can use the weights to determine which digital content is a better match to the media content 202. For example, the matching and selection system 130 can aggregate, e.g., determine a sum or average of, the weights of each matching term of the digital content that matches the media content. The matching and selection system 130 can then select the digital content having the highest aggregate weight.

In some implementations, step E also includes running the selected digital content, which was in text format, through text-to-speech system 120 to produce audio content to be presented with the media content 202.

The flow continues with step F, in which content delivery system 140 identifies a designated time or slot during which the selected digital content is to be presented and provides the selected digital content to user device 106.

As described previously, DCDS 110 can detect and/or determine slots in which additional audio content should be place.

In some implementations, exclusion zones, or portions of the content in which additional audio content should not be inserted or in which words spoken during the zones should be omitted from analysis, can be defined by a user such as a content creator or publisher. Need to describe that the publisher can specify these in their account setup—can be different for each episode. Could also be signified by a particular inaudible tone—i.e., tone 1 at beginning of exclusion zone, tone 2 at end of exclusion zone.

In some implementations, content delivery system 140 of DCDS 110 can automatically determine and indicate exclusion zones. For example, content delivery system 140 can determine when a natural pause occurs and insert a content slot while creating exclusion zones such that content is not interrupted in the middle of a sentence or segment.

In some implementations, media content being streamed can include additional content, such as sponsored content. Content delivery system 140 can create an exclusion zone for the duration of the sponsored content so as not to confuse listeners or viewers. For example, Poddington Casterly may say a few sentences during "Guest Leuy Hamster tells us about his cute bulldogs" about Mercedes because the episode is sponsored by Mercedes. Content delivery system 140 can detect these few sentences and create an exclusion zone such that no additional audio content is inserted into Poddington Casterly's sponsored spiel about Mercedes.

Content delivery system 140 may also be able to detect additional content within media content being streamed based on the topic of the content. For example, Poddington Casterly may promote the Example Brand Phone as a cool phone with an awesome camera app within his car enthusiast podcasts. Content delivery system 140 can determine that Poddington Casterly's podcasts are about cars, and that his promotion of the Example Brand Phone identifies a particular brand and is about smartphones and therefore regarding a topic wholly unrelated to cars. Content delivery system 140 can then determine that his promotion of the Example Brand Phone should be within an exclusion zone.

Content delivery system 140 can designate exclusion zones based on entities mentioned within the media content. For example, content delivery system 140 can detect a product name within the media content and omit, from the textual content of the media content, any words spoken within a specified amount of time of the location of the product name in the second audio. In one example, content delivery system 140 can detect that Poddington Casterly mentions BRAND Y butter is great butter, which all cool car drivers eat with their toast, and can determine that any words spoken within 10 seconds of when "BRAND Y" was spoken. The amount of time before and after a particular word is spoken does not have to be the same, and in some implementations, content delivery system 140 can detect whether the entity name is spoken at the beginning, middle, or end of a promotion segment to adjust the bounds of the exclusion zone.

Content delivery system 140 also performs the delivery of the selected digital content 206 to user device 106 in response to the request 108. Content delivery system 140 can provide the selected digital content 206 in reply 114.

In some implementations, DCDS 110 can act as an intermediary for delivering the media content being streamed to user device 106. For example, DCDS 110 can receive the media content, insert the additional, selected digital content into the media content, and stream the media content, along with the selected digital content, to user device 106 so that user device 106 receives a continuous stream of content.

In some implementations, system 100 as described with respect to FIGS. 1-2 can pause the stream of media content, stream the selected digital content from a different source during the designated content slot, and then continue the stream of media content to user device 106.

The flow concludes with step G, in which DCDS 110 provides, to the user device, a reply. For example, DCDS 110 provide reply 114 as described above with respect to FIG. 1 to user device 106.

FIG. 3 is a flow diagram of an example process 300 of content matching and selection using content transformation. In some implementations, process 300 can be performed by one or more systems. For example, process 300 can be implemented by DCDS 110 and/or user device(s) 106 of FIGS. 1-2. In some implementations, the process 300 can be implemented as instructions stored on a computer readable medium which may be non-transitory, and when the instructions are executed by one or more servers, the instructions can cause the one or more servers to perform operations of the process 300.

Process 300 begins with obtaining first audio (302). For example, system 100 can obtain digital content for presentation as additional content to be presented with media content. This digital content can be, for example, an audio clip from a pet store promoting dog toys for tough chewers.

Process 300 continues with storing a text transcription of the first audio in a searchable database (304). For example, text-to-speech system 120 can store a text transcription of the audio clip promoting dog toys in a searchable database, such as digital component database 112.

Process 300 continues with obtaining media content that includes second audio (306). For example, system 100 can receive media content that includes the podcast 202 from Poddington Casterly. The media content can be pre-recorded, or complete at the time of receipt, or live, such that more of the content is being obtained continuously. In some implementations, the media content can be provided to user device 106 directly from the content creator and/or publish. In other implementations, the media content can be provided to DCDS 112 which acts as an intermediary and provides the media content to user device 106.

In some implementations, the media content can be delivered separately from additional selected digital content, and that the media content can be paused while the additional selected digital content is provided to user device 106 an restarted when the additional selected digital content ends.

Process 300 continues with transforming the second audio into textual content (308). For example, text-to-speech system 120 can transform the podcast 202 to be streamed to user device 106 into text content 204. In some implementations, transforming the second audio includes detecting spoken words in the second audio, analyzing one or more audio characteristics of the second audio, adjusting an importance of one or more words from among the spoken words based on the analysis of the one or more audio characteristics, generating the textual content representing the spoken words, and assigning the adjusted importance of the one or more words to the textual content representing the one or more words. For example, text-to-speech system 120 can detect spoken words in the podcast 202, analyzing one or more audio characteristics of the podcast 202 such as vocal emphasis, generating a textual representation of the spoken words, such as text data 204, and assigning and/or adjusting weights of one or more words within text data 204.

In some implementations, analyzing the one or more audio characteristics of the second audio includes detecting an audible indication of emphasis for the one or more words. For example, an audible indication of emphasis can include repetition of the one or more words, or a volume or tone of voice of the speaker of the words. In some implementations, analyzing one or more audio characteristics includes differentiating between a first portion of the spoken words that are spoken by a host voice in the second audio and a second portion of the spoken words that are spoken by a guest voice in the second audio. For example, text-to-speech system 120 can designate portions of spoken words that are spoken by the host Poddington Casterly and portions of spoken words that are spoken by the guest Leuy Hamster.

In some implementations, adjusting the importance of the one or more words includes increasing the importance of the one or more words based on the audible indication of emphasis. For example, text-to-speech system 120 can increase the weight of the words based on the audible indication of emphasis within a model for matching and selecting digital content. In some implementations, adjusting the importance of the one or more words includes increasing the importance of the first portion of spoken words relative to the importance of the second portion of the spoken words. For example, text-to-speech system 120 can increase the weight of the words spoken by the host Poddington Casterly relative to the weight of the words spoken by the guest Leuy Hamster.

In some implementations, determining the context of the second audio includes determining a topic of the first audio based on the adjusted importance of the one or more words that is assigned to the textual content representing the one or more words. For example, matching and selection system 130 can determine a topic of the audio clip promoting dog toys based on the weight of words associated with the topic of the audio clip.

In some implementations, the importance, or weight, of particular words can be changed based on emphasis, location within a detected paragraph of the media content, term frequency, among other characteristics. In some implementations, the weight of words can be increase because of a match between a word in the text description of the media content and the detected audio. In some implementations, the weight of words can be adjusted based on whether it is the host or the guest who spoke the words.

Process 300 continues with determining, based on a search of the searchable database, that the textual content of the second audio matches the text transcription of the first audio (310). For example, matching and selection system 130 of DCDS 110 can determine, based on searching digital component database 112, that the content of the podcast 202 matches the text transcription of the audio clip promoting dog toys.

Process 300 continues with inserting the first audio into the media content to create an augmented content stream in response to the determination that the textual content of the second audio matches the text transcription of the first audio (312). For example, content delivery system 140 can insert the audio clip into the podcast 202 to create an augmented content stream after determining that the content of the podcast 202 "Guest Leuy Hamster talks about his cute bulldogs" matches the text transcription of the audio clip promoting dog toys for tough chewers, like bulldogs.

In some implementations, the process includes determining a first context of the first audio based on the textual transcription of the first audio and determining a second context of the second audio based on the textual content of the second audio, where determining that the textual content of the second audio matches the text transcription of the first audio includes determining that the first context matches the second context. This context can be a topic, or some other information that can be determined from the text obtained from the podcast. For example, content delivery system 140 can insert the audio clip into the podcast 202 to create an augmented content stream after determining that the topic of the podcast 202 "Guest Leuy Hamster talks about his cute bulldogs" matches the text transcription of the audio clip promoting dog toys.

In some implementations, the process includes identifying exclusion zones for the second audio and omitting words spoken during the exclusion zones from the textual content of the second audio. For example, content delivery system 140 can identify exclusion zones for the podcast 202 and omitting words spoken on the podcast 202 during the exclusion zones from being analyzed as part of the podcast 202 content.

Process 300 and the system as described with respect to FIG. 103 can be applied in any streaming environment, such as TV, movies, and online gaming, among other environments.

Figure 4:
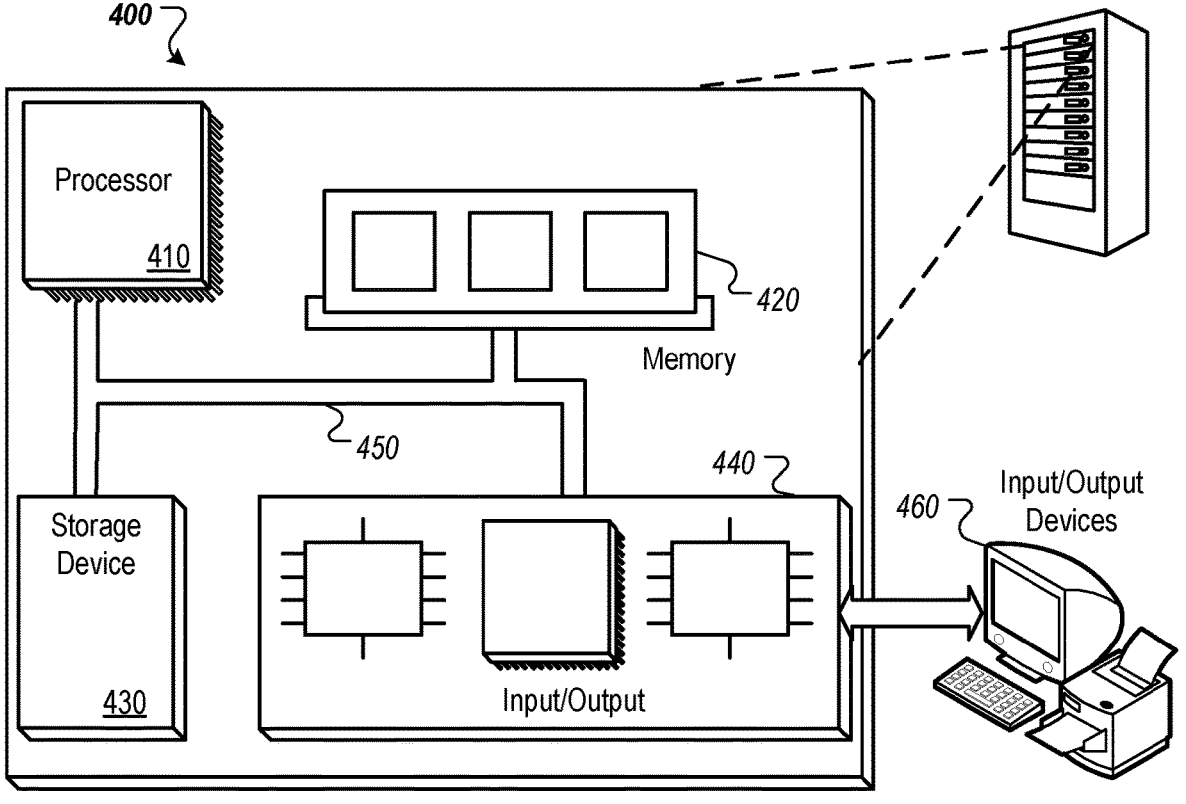
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method, comprising:
obtaining first audio;
storing a text transcription of the first audio in a searchable database;
obtaining media content that includes second audio;
transforming the second audio into textual content;
identifying, as an exclusion zone for the second audio, a duration of speech comprising one or more spoken words that occur between a first inaudible tone and a second inaudible tone, wherein the first and second inaudible tones signify that the speech that occurs during the exclusion zone is to be omitted from the textual content of the second audio;
removing words spoken during the exclusion zone from the textual content of the second audio without removing the duration of speech from the second audio;
determining, based on a search of the searchable database, that remaining textual content of the second audio after removing the words spoken during the exclusion zones matches the text transcription of the first audio; and
inserting the first audio into a content slot in the media content to create an augmented content stream in response to the determination that the textual content of the second audio matches the text transcription of the first audio, wherein the content slot occurs after the exclusion zone in the media content.

2. The method of claim 1, further comprising:
determining a first context of the first audio based on the text transcription of the first audio; and
determining a second context of the second audio based on the textual content of the second audio, wherein,
determining that the textual content of the second audio matches the text transcription of the first audio comprises determining that the first context matches the second context.

3. The method of claim 2, wherein transforming the second content into textual content comprises:
detecting spoken words in the second audio;
analyzing one or more audio characteristics of the second audio;
adjusting an importance of one or more words from among the spoken words based on the analysis of the one or more audio characteristics;
generating the textual content representing the spoken words; and
assigning the adjusted importance of the one or more words to the textual content representing the one or more words, including adjusting a weight for each of the one or more words,
wherein determining, based on a search of the searchable database, that remaining textual content of the second audio after removing the words spoken during the exclusion zones matches the text transcription of the first audio comprises selecting the text transcription of the audio based on the weights assigned to the one or more words.

4. The method of claim 3, wherein:
analyzing the one or more audio characteristics of the second audio comprises detecting an audible indication of emphasis for the one or more words;
adjusting the importance of the one or more words comprises increasing the importance of the one or more words based on the audible indication of emphasis; and
determining the second context of the second audio comprises determining a topic of the first audio based on the adjusted importance of the one or more words that is assigned to the textual content representing the one or more words.

5. The method of claim 4, wherein:
analyzing one or more audio characteristics comprises differentiating between a first portion of the spoken words that are spoken by a host voice in the second audio and a second portion of the spoken words that are spoken by a guest voice in the second audio; and
adjusting the importance of the one or more words comprises increasing the importance of the first portion of the spoken words relative to the importance of the second portion of the spoken words.

6. The method of claim 1, further comprising:
detecting, as an entity mentioned in the second audio, a product name in the second audio;
determining, based on a location of the product name in the second audio, a first specified amount of time before the product name in the second audio and a second specified amount of time after the product name in the second audio; and
omitting, from the textual content of the second audio, additional words spoken within a time period that includes the first and second specified amounts of time of before and after the product name in the second audio.

7. The method of claim 1, wherein inserting the first audio into the media content to create an augmented content stream in response to the determination that the textual content of the second audio matches the text transcription of the first audio comprises:

assigning respective weights to words of the remaining textual content based on audible and inaudible characteristics of each of the words;

identifying multiple candidate audio files including the first audio that match the remaining textual content;

for each of the multiple candidate audio files, determining an aggregate weight based on the weight assigned to each word of the remaining textual content that matches a corresponding word of the candidate audio file; and selecting the first audio from the multiple candidate audio files based on the aggregate weight for each of the multiple candidate audio files.

8. The method of claim 7, wherein:

the audible characteristics for each word comprise at least one of (i) emphasis detected in the second audio for the word, (ii) a pitch of the word in the second audio, (iii) a speed at which the word is spoken in the second audio, or (iv) whether the word was spoken by a host voice; and the inaudible characteristics for each word comprise whether the word matches a user profile of a user to which the augmented content stream is provided.

9. A system comprising:

one or more processors; and one or more memory elements including instructions that, when executed, cause the one or more processors to perform operations including:

obtaining first audio;

storing a text transcription of the first audio in a searchable database;

obtaining media content that includes second audio;

transforming the second audio into textual content;

identifying, as an exclusion zone for the second audio, a duration of speech comprising one or more spoken words that occur between a first inaudible tone and a second inaudible tone, wherein the first and second inaudible tones signify that the speech that occurs during the exclusion zone is to be omitted from the textual content of the second audio;

removing words spoken during the exclusion zone from the textual content of the second audio without removing the duration of speech from the second audio;

determining, based on a search of the searchable database, that remaining textual content of the second audio after removing the words spoken during the exclusion zones matches the text transcription of the first audio; and inserting the first audio into a content slot in the media content to create an augmented content stream in response to the determination that the textual content of the second audio matches the text transcription of the first audio, wherein the content slot occurs after the exclusion zone in the media content.

10. The system of claim 9, the operations further comprising:

determining a first context of the first audio based on the text transcription of the first audio; and determining a second context of the second audio based on the textual content of the second audio, wherein,

determining that the textual content of the second audio matches the text transcription of the first audio comprises determining that the first context matches the second context.

11. The system of claim 10, wherein transforming the second content into textual content comprises:

detecting spoken words in the second audio;

analyzing one or more audio characteristics of the second audio;

adjusting an importance of one or more words from among the spoken words based on the analysis of the one or more audio characteristics;

generating the textual content representing the spoken words; and assigning the adjusted importance of the one or more words to the textual content representing the one or more words.

12. The system of claim 11, wherein:

analyzing the one or more audio characteristics of the second audio comprises detecting an audible indication of emphasis for the one or more words;

adjusting the importance of the one or more words comprises increasing the importance of the one or more words based on the audible indication of emphasis; and determining the second context of the second audio comprises determining a topic of the first audio based on the adjusted importance of the one or more words that is assigned to the textual content representing the one or more words.

13. The system of claim 12, wherein:

detecting, as an entity mentioned in the second audio, a product name in the second audio;

determining, based on a location of the product name in the second audio, a first specified amount of time before the product name in the second audio and a second specified amount of time after the product name in the second audio; and omitting, from the textual content of the second audio, additional words spoken within a time period that includes the first and second specified amounts of time of before and after the product name in the second audio.

14. The system of claim 9, the operations further comprising:

detecting, as an entity mentioned in the second audio, a product name in the second audio; and omitting, from the textual content of the second audio, words spoken within a specified amount of time of a location of the product name in the second audio.

15. A non-transitory computer storage medium encoded with instructions that when executed by a distributed computing system cause the distributed computing system to perform operations comprising:

obtaining first audio;

storing a text transcription of the first audio in a searchable database;

obtaining media content that includes second audio;

transforming the second audio into textual content;

identifying, as an exclusion zone for the second audio, a duration of speech comprising one or more spoken words that occur between a first inaudible tone and a second inaudible tone, wherein the first and second inaudible tones signify that the speech that occurs during the exclusion zone is to be omitted from the textual content of the second audio;

removing words spoken during the exclusion zone from the textual content of the second audio without removing the duration of speech from the second audio;

determining, based on a search of the searchable database, that remaining textual content of the second audio after removing the words spoken during the exclusion zones matches the text transcription of the first audio; and inserting the first audio into a content slot in the media content to create an augmented content stream in response to the determination that the textual content of the second audio matches the text transcription of the first audio, wherein the content slot occurs after the exclusion zone in the media content.

16. The non-transitory computer storage medium of claim 15, the operations further comprising:

determining a first context of the first audio based on the text transcription of the first audio; and determining a second context of the second audio based on the textual content of the second audio, wherein, determining that the textual content of the second audio matches the text transcription of the first audio comprises determining that the first context matches the second context.

17. The non-transitory computer storage medium of claim 16, wherein transforming the second content into textual content comprises:

detecting spoken words in the second audio;

analyzing one or more audio characteristics of the second audio;

adjusting an importance of one or more words from among the spoken words based on the analysis of the one or more audio characteristics;

generating the textual content representing the spoken words; and assigning the adjusted importance of the one or more words to the textual content representing the one or more words.

18. The non-transitory computer storage medium of claim 17, wherein:

analyzing the one or more audio characteristics of the second audio comprises detecting an audible indication of emphasis for the one or more words;

adjusting the importance of the one or more words comprises increasing the importance of the one or more words based on the audible indication of emphasis; and determining the second context of the second audio comprises determining a topic of the first audio based on the adjusted importance of the one or more words that is assigned to the textual content representing the one or more words.

19. The non-transitory computer storage medium of claim 18, wherein:

analyzing one or more audio characteristics comprises differentiating between a first portion of the spoken words that are spoken by a host voice in the second audio and a second portion of the spoken words that are spoken by a guest voice in the second audio; and adjusting the importance of the one or more words comprises increasing the importance of the first portion of the spoken words relative to the importance of the second portion of the spoken words.

20. The non-transitory computer storage medium of claim 15, the operations further comprising:

detecting, as an entity mentioned in the second audio, a product name in the second audio;

determining, based on a location of the product name in the second audio, a first specified amount of time before the product name in the second audio and a second specified amount of time after the product name in the second audio; and omitting, from the textual content of the second audio, additional words spoken a time period that includes the first and second specified amounts of time of before and after the product name in the second audio.

* * * * *